United States Patent [19]

Mattila

[11] Patent Number: 5,194,920

[45] Date of Patent: * Mar. 16, 1993

[54] METHOD AND APPARATUS FOR MEASURING ALIGNMENT STATUS

[75] Inventor: Raimo Mattila, Rajamäki, Finland

[73] Assignee: Imatran Voima Oy, Helsinki, Finland

[ * ] Notice: The portion of the term of this patent subsequent to Jul. 7, 2009 has been disclaimed.

[21] Appl. No.: 819,173

[22] Filed: Jan. 10, 1992

Related U.S. Application Data

[62] Division of Ser. No. 534,245, Jun. 7, 1990, Pat. No. 5,127,738.

[30] Foreign Application Priority Data

Jun. 26, 1989 [FI] Finland ................................ 893106

[51] Int. Cl.$^5$ ............................................ G01B 11/00
[52] U.S. Cl. ..................... 356/400; 356/153; 250/231.16; 250/231.18
[58] Field of Search ................ 356/400, 153; 250/231.18, 231.16

[56] References Cited

U.S. PATENT DOCUMENTS

| | | | |
|---|---|---|---|
| 4,293,218 | 10/1981 | Nielsen et al. | 356/153 |
| 4,674,870 | 6/1987 | Cain et al. | 356/400 |
| 4,698,491 | 10/1987 | Lysen | 356/400 |
| 5,127,738 | 7/1992 | Mattila | 356/400 |

*Primary Examiner*—Samuel A. Turner

[57] ABSTRACT

The present invention concerns a measurement method of the alignment status of a shaft line (16) in rotating machineries and an apparatus for the implementation of the method. According to the invention, the displacement of alignment is measured at convenient points of the shaft line (16) from the displacement of an optically fanned laser beam (4) hitting sensor units (10, 11). At the beginning of a measurement session, a zero reference point is determined for the beam (4) and the measurement values of the sensor units (10, 11) are compared against this reference value during the measurement session. The relative displacement is obtained as the difference between the initial value and the value during the measurement. The apparatus and method is also applicable to the measurement of displacements in pipelines, long shafts and other similar systems.

4 Claims, 3 Drawing Sheets

METHOD AND APPARATUS FOR MEASURING ALIGNMENT STATUS

This application is a divisional of copending application Ser. No. 07/534,245, filed on Jun. 7, 1990, now U.S. Pat. No. 5,127,738.

BACKGROUND OF THE INVENTION

The present invention relates to a method for measuring the alignment status of shafts.

The invention also concerns a measurement apparatus of alignment status.

Alignment status refers to the actual position of the shafts of, for instance, cocentrically mounted rotating machines after assembly and during use. The straightness of alignment is an essential factor particularly for the operation of large and rapidly rotating machinery. Such machines include turbine-generator machines of power plants, propulsion systems for ships with screw propeller drives, and different kinds of pump and blower machinery. Problems akin to the measurement of alignment status in rotating machinery are encountered in the deflection and vibration measurements of piping and evaporator equipment and in the deflection measurements performed during the loading and pressurization tests of different machines and pressure vessels.

In most cases the problem of missing measurements of alignment status has been experienced during the vibration measurements of the turbine machinery. The same problem is also encountered with pumps and blowers, because these machines are installed and aligned while being at ambient temperature. In general, a sufficiently widely applicable measurement method capable of taking into account deflections caused by the heating of machinery has been lacking. Practical experience has, however, revealed that the relative displacements between the bearings as well as the bearings and their yokes cause substantial vibration problems generally invoked by the incorrect distribution of bearing loads between the individual bearings or by the friction of labyrinth ring seals and other types of seals. If it were possible to measure the changes in the alignment status during the running of the machinery in a reliable manner, the alignment could be adjusted to match the actual operating conditions to a higher degree, thereby allowing for a reduction of vibrations and wear in the machinery.

Measurement of the alignment of a shaft line is conventionally performed using, for instance, the following methods:

A "liquid level" developed by ENEL is based on the conventional principle known from levelling equipment. This equipment is intended for continuous monitoring. The device has a complicated construction which is difficult to install and can't be moved. Further, the equipment is incapable of measuring movements in the horizontal plane. In regard to its operating principle, the system is inaccurate.

A laser-optical meter called "Permalign" is comprised of a laser and a beam detector. The laser is attached to either of the machines or bearing yokes and the detector cell is attached to the other. The device is applicable for continuous monitoring of two adjacently located bearings, while, however, unsuitable for the alignment status measurement of the entire shaft line in the turbine machinery. The equipment can only measure the relative displacements between any two points.

Disclosed in the publication WO 85/05443 is a measurement equipment for the relative displacement of two machines with a cocentrical shaft line. This equipment measures the displacements with the help of three measurement elements, which are comprised of a light source, a reflection prism and a beam detector. The light source and the beam detector are mounted to one of the machines, while the reflection prism is attached to the other machine. The displacements are measured by directing a light beam onto the prism which reflects the beam to a detector placed adjacent to the light source. The displacements of the machines in relation to each other can be computed from the displacement of the reflected beam. This method provides only for the measurement of the relative mutual displacement of two machines.

A measurement method based on the use of a laser is disclosed in U.S. Pat. No. 3,902,810 featuring a capability of simultaneous alignment of several machines with cocentrical shafts during assembly. This method does not lend itself to the measurement of displacements during the running of the machinery.

Thus, none of the commercially available measurement equipment is universally applicable to the alignment status monitoring of an entire turbomachinery outfit.

SUMMARY OF THE INVENTION

The present invention aims to achieve a method capable of continuous measurement of shaft line deviations of several machines with cocentrically aligned shafts even during the running of the machines.

The invention is based on directing a fan shaped laser beam onto a sensor element, the number of which can be one or greater, and then determining the relative displacement of each sensor element from the signals of the sensors.

The invention offers significant benefits.

The apparatus facilitates the continuous measurement of displacements of the shaft line of several machines aligned with cocentrical shafts. In addition, the present method makes it possible to measure the displacements of pipelines and corresponding systems during running. Furthermore, the present method is applicable in vibration measurements. The method is accurate and provides in all conditions a precise indication of the relative displacement against a reference point, or alternatively, through intercomparison of signals from adjacent sensors. Because the laser beam hits at least two sensors, the displacement or detachment of one of sensors or the laser unit is easily detectable. In addition to relative displacements, the present method provides the measurement of the absolute displacements of the measured points. Moreover, the apparatus necessary for the implementation of the method is easily portable as well as simple to install and use. The measurement computer of the system can be fed with 0 . . . 10 process variable channels (such as turbine elongations, power levels and temperatures), whereby changes in the alignment status can be compared with changes in the process status.

BRIEF DESCRIPTION OF THE DRAWINGS

The invention is next examined in detail with the help of reference to the enclosed drawings which illustrate an apparatus intended for the implementation of the method.

DETAILED DESCRIPTION OF PREFERRED EMBODIMENT

Figure 1:
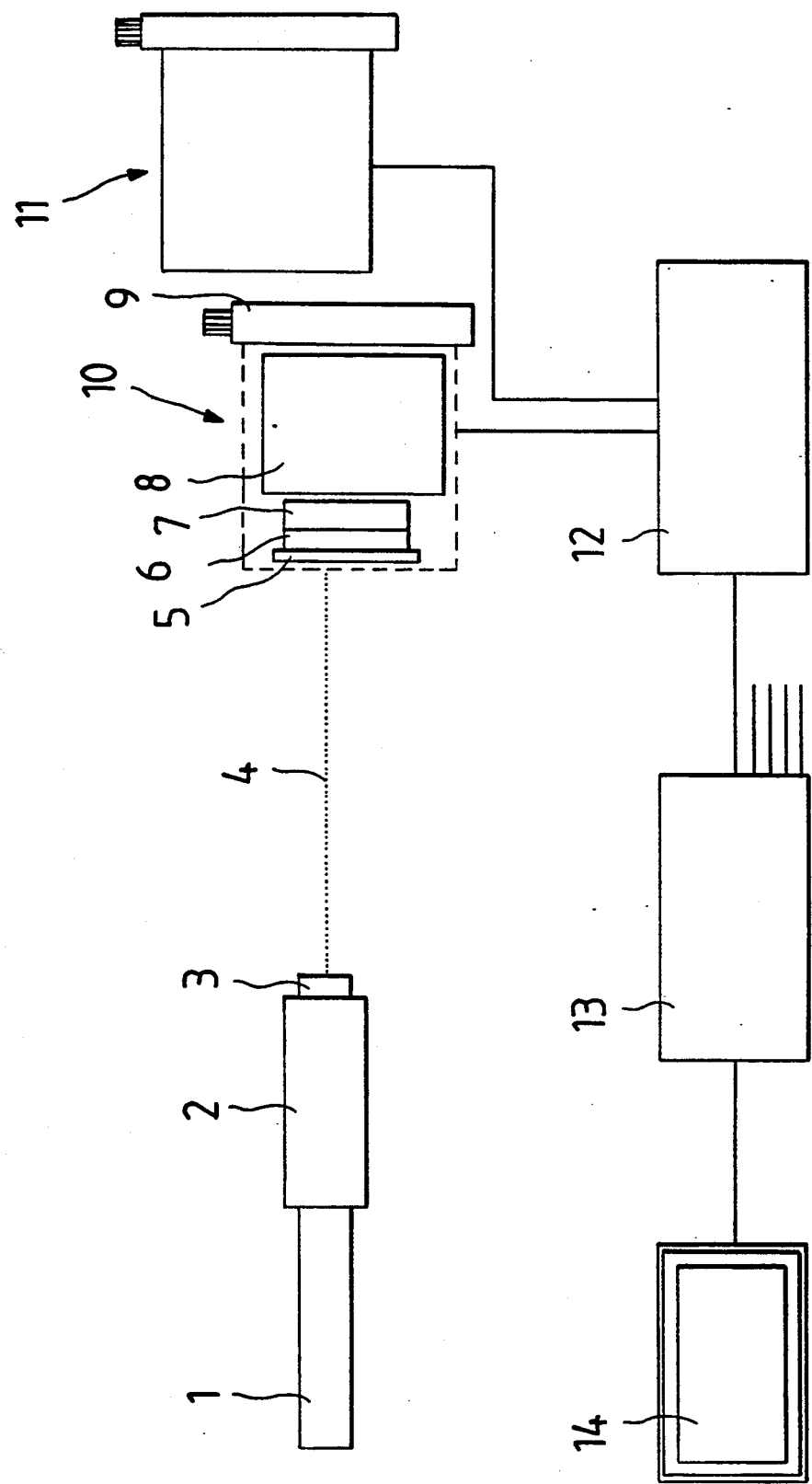
FIG. 1 shows diagrammatically one of the measurement unit from which the apparatus is constructed.
Figure 2:
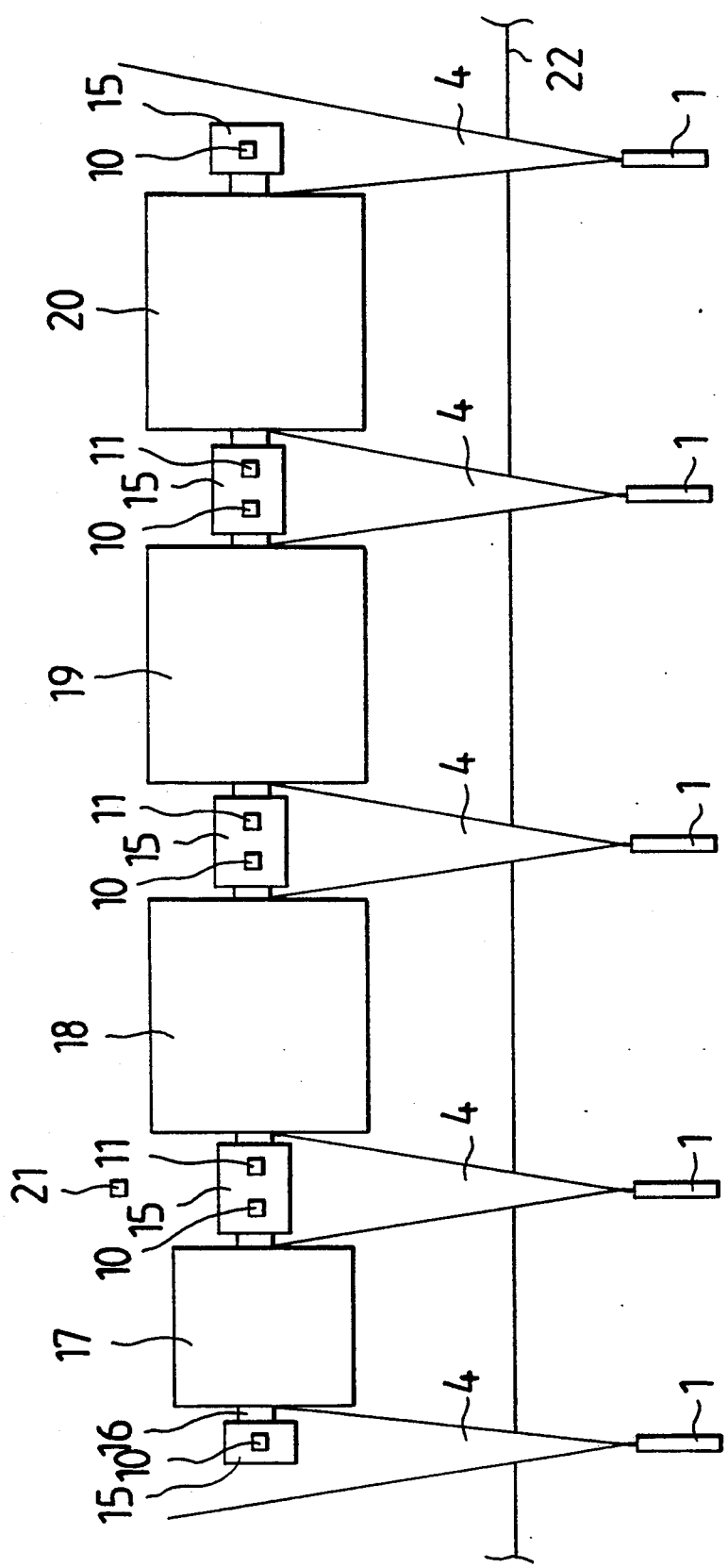
FIG. 2 shows the apparatus diagrammatically in a top view from above the turbine machinery shaft line.
Figure 3:
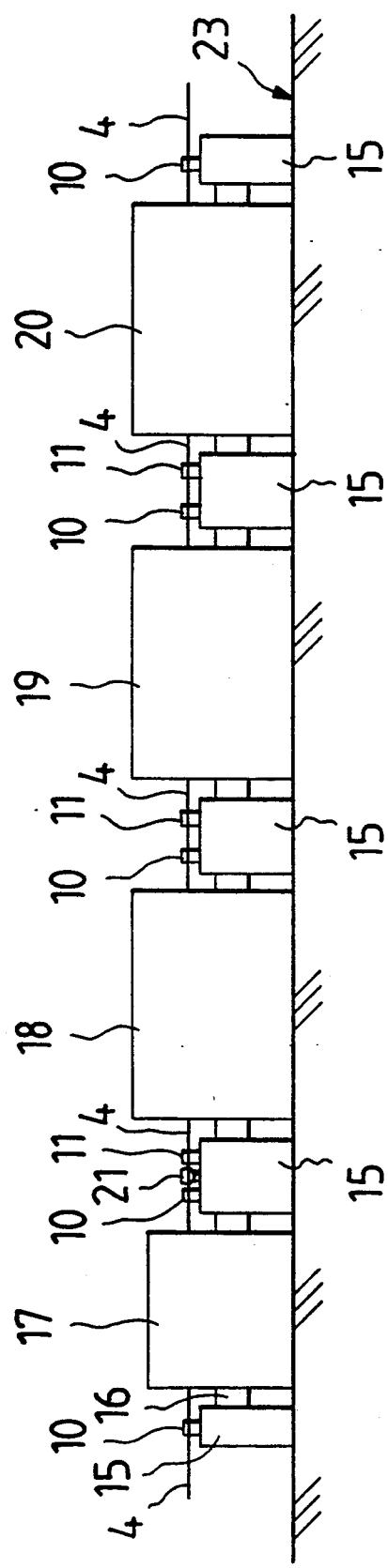
FIG. 3 shows the apparatus diagrammatically in a side view behind the laser units.

In this exemplifying embodiment, the measurement apparatus is adapted to a shaft line 16 between turbines 18, 19 and 20 of a hydroelectric power plant and an electric generator 17. The laser units 1 are placed on triangular foundations on the turbine hall floor 23 behind a floor expansion joint 22 in relation to the turbines. A beam 4 emitted from the lasers 1 is aimed at measurement sensors 10, 11 placed on the bearing yokes 15 of the turbines 18, 19 and 20 and the generator 17. The signals obtained from measurement sensors 10, 11 allow for the indication of the position of the beam 4, while the relative displacement of the sensors is obtained through the subtraction of the readings provided by the sensors 10, 11. Alternatively, the use of a reference sensor 21 allows for the detection of the displacement of the sensors 10, 11 in relation to the reference sensor 21, thereby permitting the compensation of any possible displacement of the lasers 1.

An arrangement in which the measurement sensors 10, 11 are placed at each coupling section of the shaft, while the reference is selected to be one of the sensors on the shaft line or a separate reference sensor 21, allows for the recording of the relative displacement of shaft line alignment between the turbines 18, 19 and 20 during the running-up of a power plant, for instance This procedure is carried out by measuring the change in the average position of the beam 4 for each sensor 10, 11 in relation to the initial situation.

The measurement apparatus is composed of the units illustrated in FIG. 1. A Helium-Neon laser 1 emits a visible red light beam with a circular cross-section of about 2 mm diameter. The beam is directed through a telescope 2 and a cylindrical lens 3 in order to obtain a horizontally flattened, fan-shaped beam 4. The beam 4 is aimed at one or several sensors 10, 11 placed at a distance of, e.g., 5 ... 10 m from the laser 1. Due to the distance, the use of the telescope 2 is necessary to keep the shape of the beam 4 as a sufficiently flat fan beam even at 10 m distance. The measurement sensor unit 10, 11 comprises in the propagation direction of the beam 4 first a circularly polarizing filter plate 5, a He-Ne spectrum line filter 6, a CCD measurement sensor element 7 with its associated electronics 8, and a micrometer screw 9 for the height adjustment of the sensor section 10, 11 of the sensor unit. Measurement data produced by the CCD sensor element 7 is transferred from the sensor unit 10 to a processor unit 12, which handles the computations for each sensor pair 10, 11. The computation programs in the PC microcomputer 14 and the processor unit 12 operates in an integrated manner so that the PC 14 can query measurement information from several sensor units 10, 11 through a data concentrator 13. The PC 14 reads simultaneously measured displacement values of sensor unit pairs 10, 11 from processor units 12 through the data concentrator 13. The data concentrator 13 contains a power supply which provides operating voltages to the processor units 12 and further to sensor units 10, 11. The measurement system can incorporate, for instance, 5 pcs. of processor units 12, whereby the total number sensor units is 10 pcs.

The measurement sensors 10, 11 are placed in pairs over bearing yokes 15 of a shaft 16. Thereby, the fan-shaped beam of a single laser unit 1 can always hit the sensor elements of two sensor units 10, 11 simultaneously. Such an arrangement ensures that the relative displacement between the sensors is measured in all conditions. By contrast, the use of a dedicated laser 1 for each of the sensors 10, 11 would cause a measurement error of the relative displacement by errors in the determination of the positions of the lasers and by a possible displacement of the lasers during measurements. Furthermore, the fan-shaped form of the beam 4 manages with a lower number of the lasers 1. The measurement sensors 10, 11 are attached to the bearing yokes 15 by means of micrometer screws 9. The micrometer screws 9 make it possible to adjust the beam 4 of the laser 1 to hit a desired spot on the measurement sensor element 7 to comply with an estimated or measured displacement. The laser units 1 are placed on a tripod resting on a steady foundation in a location which in the exemplifying case is behind an expansion joint 22 on a floor 23 of the machinery hall. By virtue of this method, the effect of machinery vibration on the operation of the lasers 1 is avoided and the alignment of the beam 4 is held steady, thereby allowing for the measurement of absolute displacements when desired.

The measurement of the shaft line 16 illustrated in the example takes place as follows. First, the reference values for each sensor 10, 11 are measured after the installation is completed and the turbine units 18, 19, 20 and the generator 17 are still not rotating. The position of each bearing yoke is measured at a selected splitting plane, wherein one reference point per bearing is generally sufficient. These measured values are later taken as reference values for the measurements. Because the measured point is assigned the zero displacement reference point, the positions of the lasers 1 need not be measured, thereby relaxing the positional accuracy requirements during the installation of the laser 1, since the actual location of the zero reference point has no effect on the measured value which is the displacement from the zero point. The relative displacements are obtained as deviations from the zero point. One of the measured points can be selected as the reference point to which the displacements of the other points are referenced, while alternatively the use of a separate reference sensor 21 is also possible. The reference sensor 21 can be fixed to any desired point; yet a location of the reference point between two sensors 10, 11 so that the beam 4 of the laser 1 also hits the sensor element 7 of the reference sensor unit 21 makes the use of a separate laser 1 for the measurement of the reference point unnecessary. Through the use of the reference point, the effect of the displacement of the laser produces no error in the relative displacements.

As soon as the reference values and the reference point have been measured, the machinery can be started. Displacements of all points in relation to the reference point are monitored throughout the entire running-up cycle. When considered necessary, the monitoring function can be extended to cover the normal operation of the machinery. If excessive displacement of measured points is detected or the measurement indicates vibrations or tendency to vibration of the shaft line 16, the shaft line 16 must be realigned.

The measurement results can be printed in a desired manner. A convenient method is to display the relative displacement and measured process signals at constant intervals. The measurement results to be displayed are user-selectable in the system with user-definable scaling The display of the system is continually updated with the progress of the measurement.

An alternative method is to display, for instance, the relative displacements in geometrical projection display of the monitored construction. The turbine sections are satisfactorily monitored by the display of displacements at the shaft, bearings and couplings.

In addition to the exemplifying embodiment described above, the method and apparatus in accordance with the invention can have alternative embodiments. Instead of the displacement measurements, the apparatus can be used for measuring vibrations by indicating the instantaneous position of the beam on the sensor element surface. Through the recording of the displacement and vibration signals during the run-up and run-down as well as normal operation, the correlation of the signals with simultaneously recorded process values becomes possible. In addition to the alignment of shaft lines in turbine and generator machineries, the apparatus is applicable to the alignment of pump and fan machineries as well as the displacement and vibration measurements of pipelines and evaporators and further to the displacement and vibration measurements of machines and pressure vessels during their loading and pressurization tests.

An interesting application of the invention is in the alignment of screw propeller shafts of ships and boats, for instance, in order to measure the shaft alignment of long shafts of high rotational speed or of such small-diameter shafts that transmit high power. In these cases the shaft line can be provided with several sensors, and when the beam of the laser is expanded into an wide-fanned beam of appropriate shape, the beam of a single laser can be made to hit several sensors simultaneously, which the absolute straightness of the horizontally fanned beam allows for an accurate measurement of relative displacements of the sensors due to the exact horizontal plane position of the beam at each sensor.

What is claimed is:

1. A measurement apparatus for measurement of alignment status of vibrating machinery comprising at least one laser (1)
    incorporating a telescope (2) and a lens (3), which elements serve for the expansion of the beam of the laser (1) into a stationary horizontally fanned beam (4), and means or positioning said laser (1) outside the measured line,
    at least one sensor unit assembly comprising at least two measurement sensor units (10, 11) onto which the fan-shaped beam (4) of the laser (1) can be directed simultaneously, the sensor units being positioned on the measured line during the measurement, and
    first data processing means operatively connected to each of said sensor units (10, 11) for reading the measurement information from units and for processing said information, and second data processing means for further reading the measurement information from sensor unit assemblies and for processing said information.

2. A measurement apparatus in accordance with claim 1, wherein said second data processing means comprise a computer (14) and a data concentrator (13) through which said computer (14) can read the simultaneous measurement values from both sensor units of a each sensor unit assembly in a sequential manner.

3. A measurement apparatus of alignment status comprising at least one laser (1) incorporating a telescope (2) and a lens (3), which elements serve for the expansion of the beam of the laser (1) into a stationary horizontally fanned beam (4), and means for positioning said laser (1) outside the measured line,
    at least one sensor unit assembly comprising at least two measurement sensor units (10, 11) onto which the fan-shaped beam (4) of the laser (1) can be directed simultaneously, the sensor units being positioned on the measured line during the measurement,
    data processing means operatively connected to each of said sensor units (10, 11) for reading the measurement information from units and for processing said information, and
    a reference sensor (21) is placed outside the measured line and on the path of the beam of the laser (1) for providing a measurement value against which the measurement values of the other sensor units (10, 11) are compared.

4. A measurement apparatus of alignment status comprising at least one laser (1)
    incorporating a telescope (2) and a lens (3), which elements serve for the expansion of the beam of the laser (1) into a stationary horizontally fanned beam (4), and means for positioning said laser (1) outside the measured line,
    at least one sensor unit assembly comprising at least two measurement sensor units (10, 11) onto which the fan-shaped beam (4) of the laser (1) can be directed simultaneously, the sensor units being positioned on the measured line during the measurement, data processing means operatively connected to each of said sensor units (10, 11) for reading the measurement information from units and for processing said information, and
    said sensor units (10, 11) are arranged on the measured line adjacent to each other so that a single laser beam can hit both of said sensor units (10, 11) simultaneously.

* * * * *